No. 611,589. Patented Sept. 27, 1898.
G. BROWNING.
SUPPORTING AND LOCKING APPLIANCE FOR BICYCLES, &c.
(Application filed Aug. 9, 1897.)
(No Model.) 5 Sheets—Sheet 1.
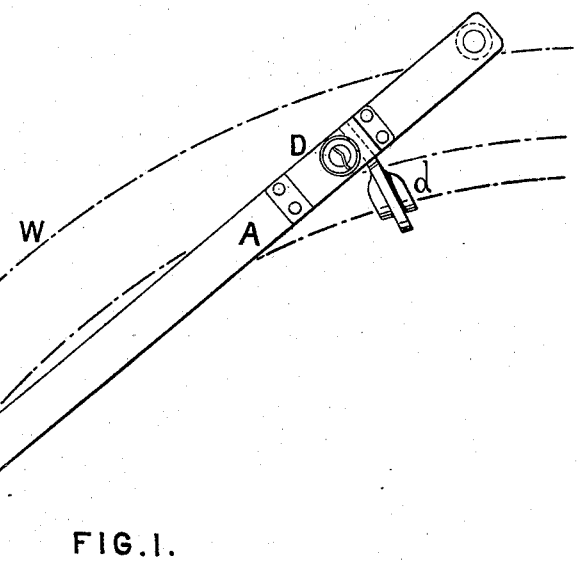
FIG.1.
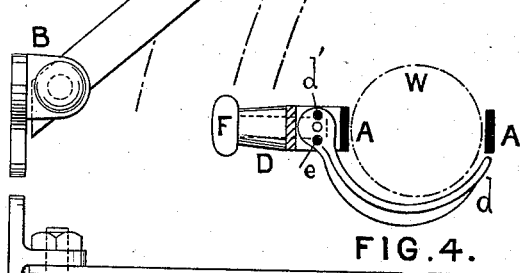
FIG.4.
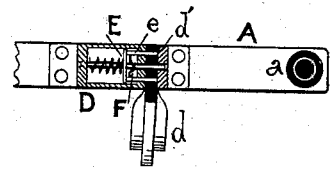
FIG.5.
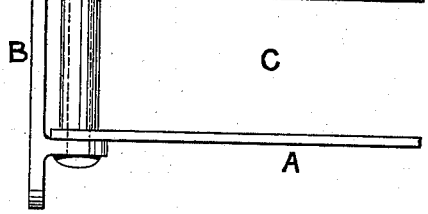
FIG.2.
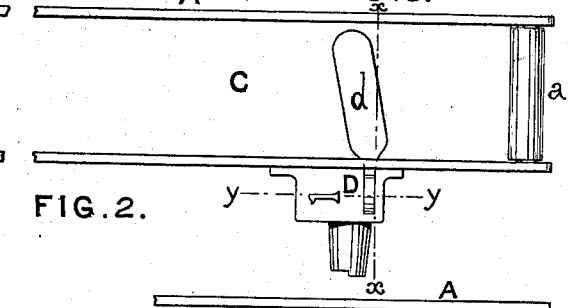
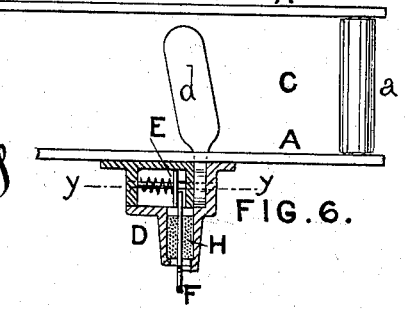
FIG.6.
WITNESSES
Joseph Bates.
E. Howard
INVENTOR
George Browning
by Simpson & Simpson
attys.
THE NORRIS PETERS CO., PHOTO-LITHO., WASHINGTON, D. C.

No. 611,589. Patented Sept. 27, 1898.
G. BROWNING.
SUPPORTING AND LOCKING APPLIANCE FOR BICYCLES, &c.
(Application filed Aug. 9, 1897.)

(No Model.) 5 Sheets—Sheet 2.

WITNESSES.
Joseph Bates.
E. Howard.

INVENTOR.
George Browning
by Wm. T. Thompson Co.
attys.

No. 611,589. Patented Sept. 27, 1898.
G. BROWNING.
SUPPORTING AND LOCKING APPLIANCE FOR BICYCLES, &c.
(Application filed Aug. 9, 1897.)
(No Model.) 5 Sheets—Sheet 3.
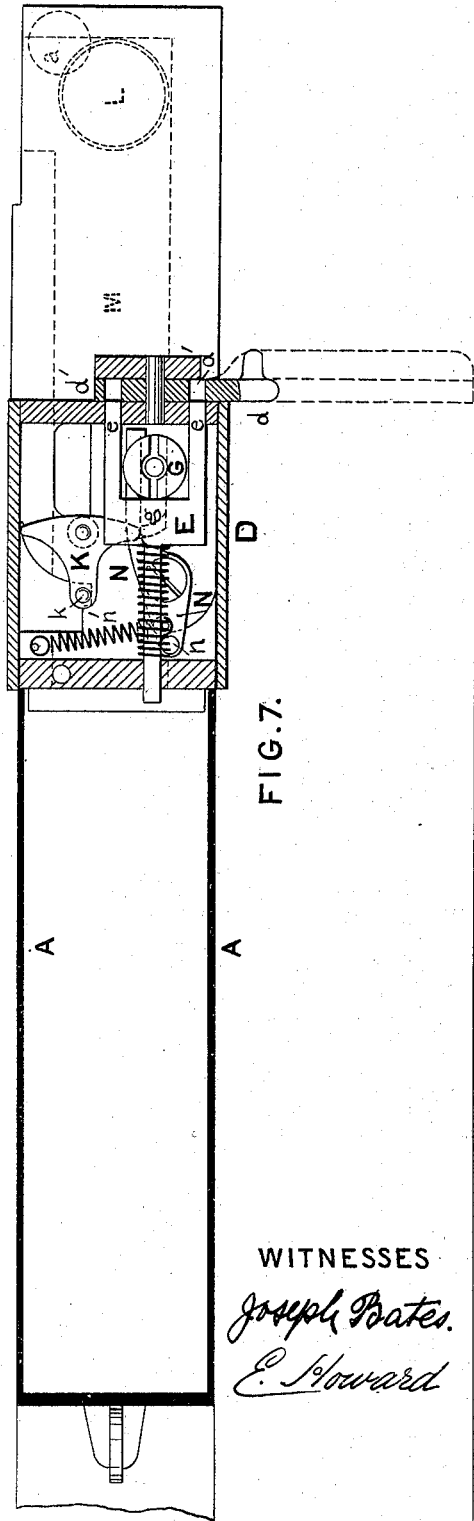
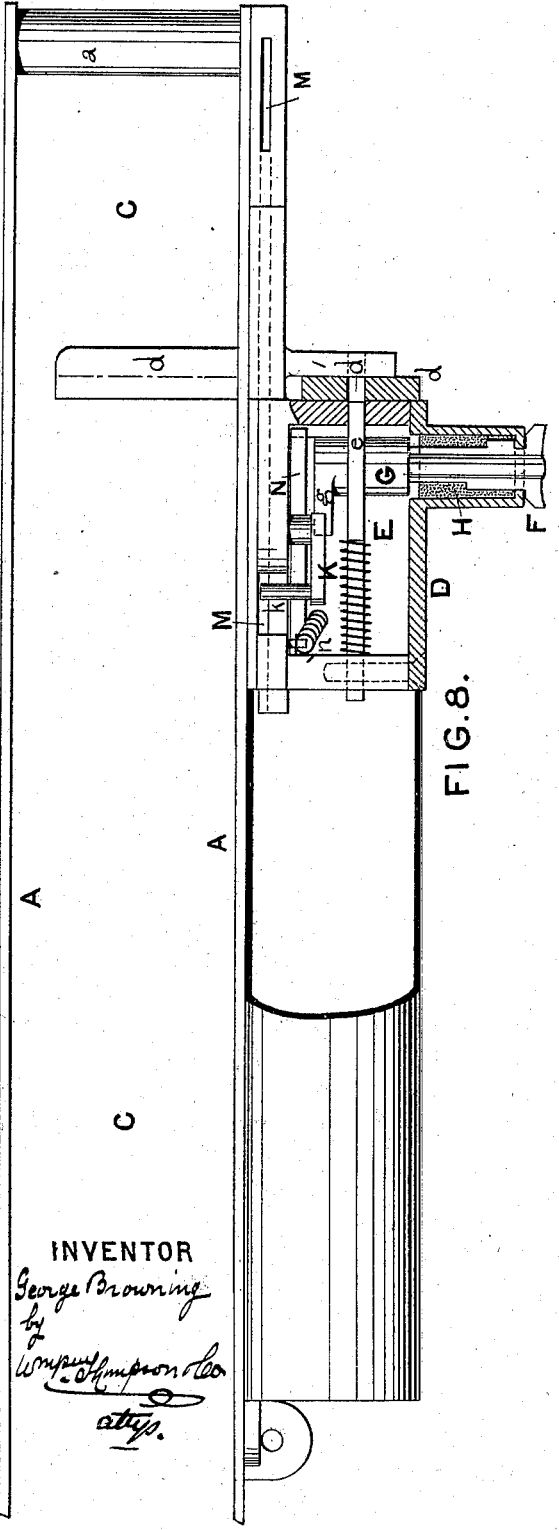
WITNESSES
Joseph Bates.
E. Howard
INVENTOR
George Browning
by
Wmpey Thompson &Co
attys.
THE NORRIS PETERS CO., PHOTO-LITHO., WASHINGTON, D. C.

No. 611,589. Patented Sept. 27, 1898.
G. BROWNING.
SUPPORTING AND LOCKING APPLIANCE FOR BICYCLES, &c.
(Application filed Aug. 9, 1897.)
(No Model.) 5 Sheets—Sheet 4.
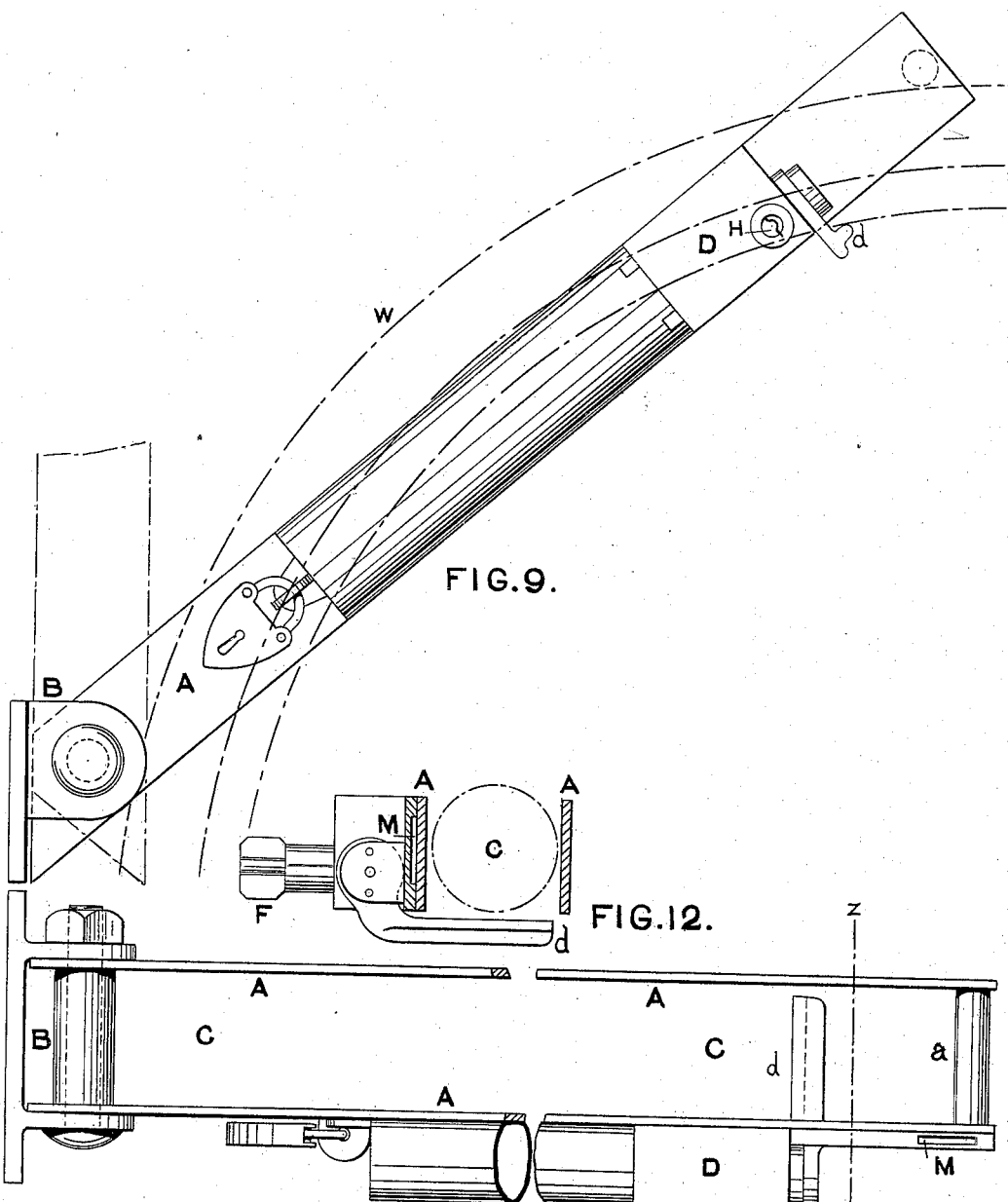

No. 611,589. Patented Sept. 27, 1898.
G. BROWNING.
SUPPORTING AND LOCKING APPLIANCE FOR BICYCLES, &c.
(Application filed Aug. 9, 1897.)

(No Model.) 5 Sheets—Sheet 5.

WITNESSES. INVENTOR
Joseph Bates George Browning.
E. Howard By Wm P. Thompson Co.
atty's.

THE NORRIS PETERS CO., PHOTO-LITHO., WASHINGTON, D. C.

UNITED STATES PATENT OFFICE.

GEORGE BROWNING, OF BOOTLE, ENGLAND, ASSIGNOR OF ONE-THIRD TO JOSEPH HIRAM PARKER, OF WATERFOOT, ENGLAND.

SUPPORTING AND LOCKING APPLIANCE FOR BICYCLES, &c.

SPECIFICATION forming part of Letters Patent No. 611,589, dated September 27, 1898.

Application filed August 9, 1897. Serial No. 647,641. (No model.)

*To all whom it may concern:*

Be it known that I, GEORGE BROWNING, of Bootle, in the county of Lancaster, England, have invented certain new and useful Improvements in Supporting and Locking Appliances for Bicycles and other Vehicles, of which the following is a specification.

The invention relates to an arm or stand for maintaining the bicycle in an upright position and for locking or securing it to prevent theft.

It consists, essentially, of a swinging arm of looped shape provided at one side with a lock and pivoted or swiveling finger which engages with and locks the wheel, a tumbler or lever for releasing the key on the insertion of a coin, and a receptacle for the coin. It will be fully described with reference to the accompanying drawings.

Figure 3:
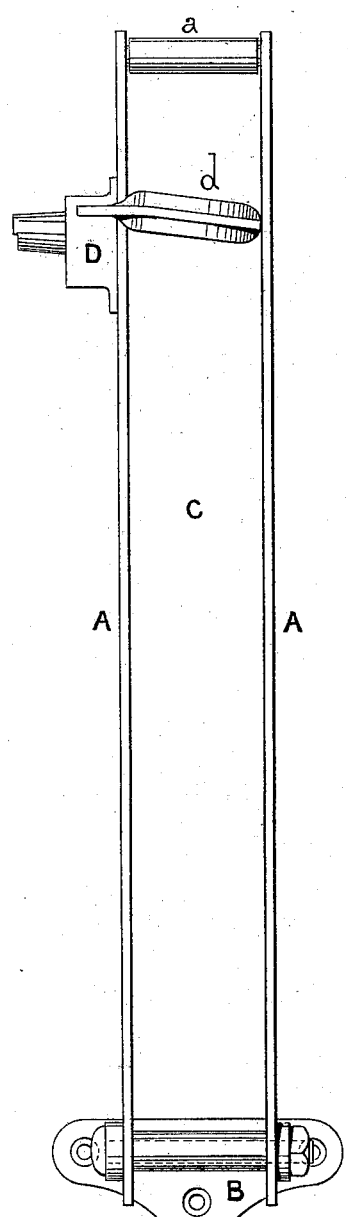
Figure 11:
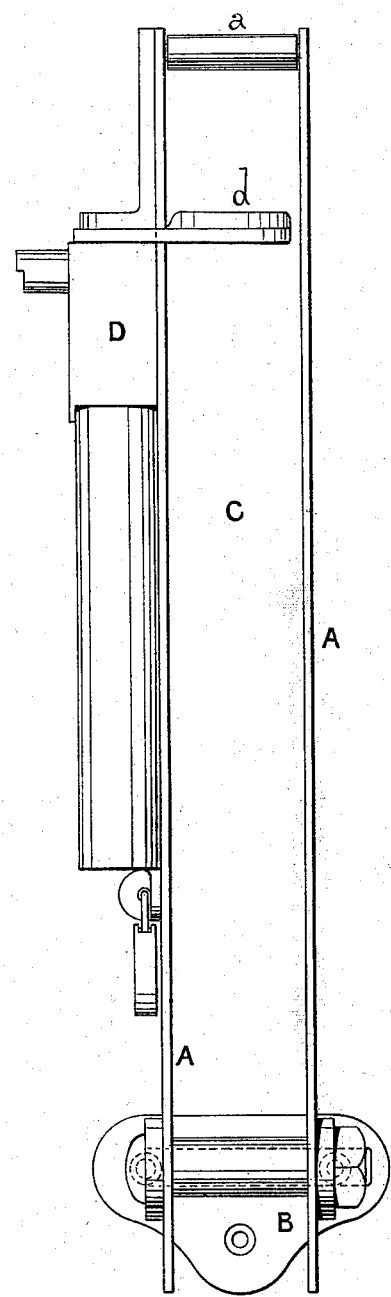
Figure 13:
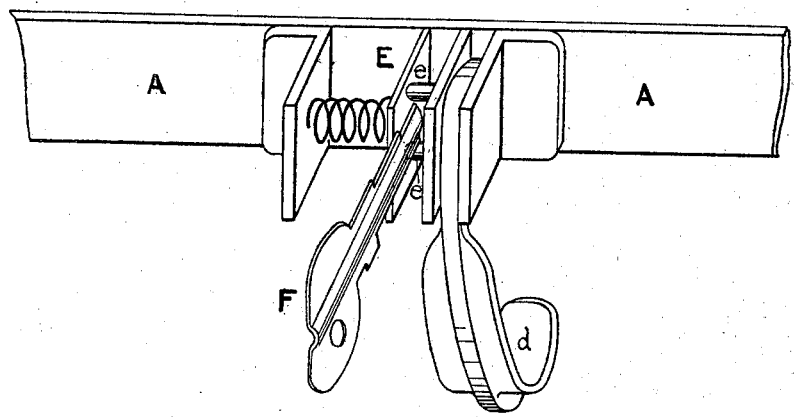
Figure 14:
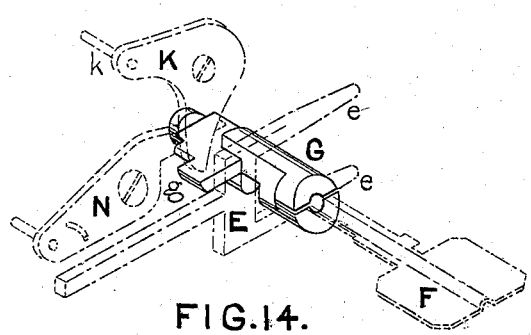

Figure 1 is a side elevation of the appliance in position to engage with the wheel of a cycle; Fig. 2, a plan of the same; Fig. 3, a front elevation when raised and out of use; Fig. 4, a transverse sectional elevation on the line $xx$, Fig. 2; Fig. 5, a longitudinal sectional elevation on the line $yy$, Fig. 2; Fig. 6, a sectional plan of Fig. 5; Fig. 7, an enlarged side elevation in section through the lock; Fig. 8, an enlarged plan in section through the lock; Fig. 9, a side elevation of the appliance, showing coin-freed lock in position for engaging wheel; Fig. 10, a plan of the same; Fig. 11, a front elevation of the same, showing the appliance raised in position when out of use; Fig. 12, a transverse sectional elevation on the line $zz$, Fig. 10; Fig. 13, a perspective view of the sliding bolt E and parts operated by the key, as in Figs. 5 and 6; and Fig. 14, a perspective view of the cam G.

I construct the arm A in the form of a loop or other convenient form pivoted to a stand or bracket B. This arm may be made of two or more pieces riveted or bolted together, leaving an aperture C to embrace the wheel, or it may be made of a single piece of metal or wood bent to the desired form. I at present prefer to construct it of two pieces riveted together with a small roller $a$ in front to glide over the wheel.

One arm is provided with a lock D, comprising a pivoted finger or latch or lever $d$ to engage with or be passed under the inner side of the wheel or rim W between the spokes, and thus prevent the cycle being removed until the finger or latch $d$ is unfastened and released. The finger lever or latch $d$ is pivoted in a suitable position, and the lock comprises a sliding bolt or its equivalent E, preferably with two bolts $e$, which engage with holes $d'$ in the pivoted finger when in the position to be locked. A flat key F or a key of other suitable shape is inserted between the bolt E and a fixed part of the lock, or a cam or eccentric G, Figs. 7 and 8, may be placed against the bolt, by turning which the bolts $e$ are withdrawn. Above the lock is placed a barrel or rotating circular block H or similar device carrying wards or their equivalent or formed with a curved or angular slit or other slit of special shape or design to correspond with the key and to prevent any but the right key entering the lock. I at present prefer a flat key F, bent or shaped with a projection or lug on one or both sides.

It is desirable in some cases that the key F should not be capable of being removed from the lock unless when the finger or lever $d$ is locked, and also to prevent the use of the lock without the insertion of a coin. For this purpose I employ a pivoted tumbler K or the like, Figs. 7 and 8, which prevents the turning of the key F in the lock or the turning of the cam G, which operates the lock-bolt. This tumbler K is raised free of the key F or the cam or eccentric G on the insertion of a coin L in a slot provided to receive it.

I form the cam or eccentric G, which operates the bolt E, with a projection or pin $g$ at one side, over which the pivoted tumbler K falls and prevents its rotation. At the side of the lock I provide a slot M, through which a coin travels, and projecting through a hole or slot into this is a pin $k$ in the side of the tumbler K, against which the coin in its travel comes in contact and raises the tumbler K free of the cam or eccentric G or the key F. The coin is held in that position by a pin $n$, projecting from a second lever or tumbler N, which is moved out of the way and releases the coin by the turning of the key, thus allowing the first tumbler K to return and to engage again with the cam or key when the bolt E is unlocked. The second tumbler or lever N is held in normal position by a spring $n'$ and is raised to release the coin by the turning of the key or cam G, so that the return movement of the first tumbler K follows the actuation of the second one N and the release of the coin.

The projections on the cam G or key F for actuating the bolt may be so placed and the movement of the tumbler K may be so timed that the cycle of operations may take place at any point in the movement of the key that may be desired.

The arms are pivoted to brackets or stands in the position shown in Figs. 1 and 9, so as to receive the wheel of a cycle when run under them, and may be turned up flat, as in Figs. 3 and 11, when not in use, being provided with a knife-spring or other spring or device to maintain them in an upright position.

What I claim as my invention, and desire to protect by Letters Patent, is—

1. In a supporting and locking appliance for securing cycles the combination with the pivoted arm A to engage the wheel and latch-lever $d$ to embrace the under side, of the locking-bolt $e$, the rotatable cam G for controlling the bolt, a casing provided with the slot M to receive a coin, a pivoted tumbling-lever K to engage the cam G and the pivoted lever N which holds the coin until the cam G is moved.

2. In a supporting and locking appliance for securing cycles the combination with the pivoted arm A, of the latch-lever $d$ and lock D, the slotted coin-receiver M, the pivoted tumbler-lever K, the pivoted discharge-lever N, and the receptacle to receive the coins, substantially as described.

In testimony whereof I have signed my name to this specification in the presence of two subscribing witnesses.

GEORGE BROWNING.

Witnesses:
JOHN GEORGE PROUT,
WALTER HENRY BROWNING.